April 25, 1939.  H. E. KRANZ  2,155,557

MOTOR CONTROL

Filed Aug. 14, 1937

Inventor:
Hermann E. Kranz,
By: Robert L. Kahn
Attorney.

Patented Apr. 25, 1939

2,155,557

UNITED STATES PATENT OFFICE 2,155,557

MOTOR CONTROL

Hermann E. Kranz, Elmhurst, Ill., assignor to Eisbert Manufacturing Company, Inc., Chicago, Ill., a corporation of Illinois Application August 14, 1937, Serial No. 159,130

4 Claims. (Cl. 172—179)

This invention relates to motor controls and particularly to stopping the motor quickly and in one of a plurality of predetermined positions. In particular, this invention relates to the impulse motor described in United States Patent 2,063,340 granted December 8, 1936, to Ruben. In that patent, a motor is disclosed having three or more opposed pairs of pole faces with a rotor having at least eight poles. By a progressive energization of opposing pairs of coils, a rotary field is created which tends to pull the rotor. Such a motor is particularly adapted for slow speed work such as windshield wipers, motor driven gang condensers for radio receivers and the like.

With a motor of this type, particularly if used for radio receivers, it is desirable that a quick stopping of the motor occur and that the motor preferably stop at a predetermined position. In general, this is accomplished by eliminating the commutator from the system and energizing one or more of the opposed coils. Since, in effect, this creates a stationary field, it is clear that the rotor will be stopped by a powerful braking action and assume a position so that the magnetic air gaps are a minimum.

Referring to the drawing.

Figure 1:
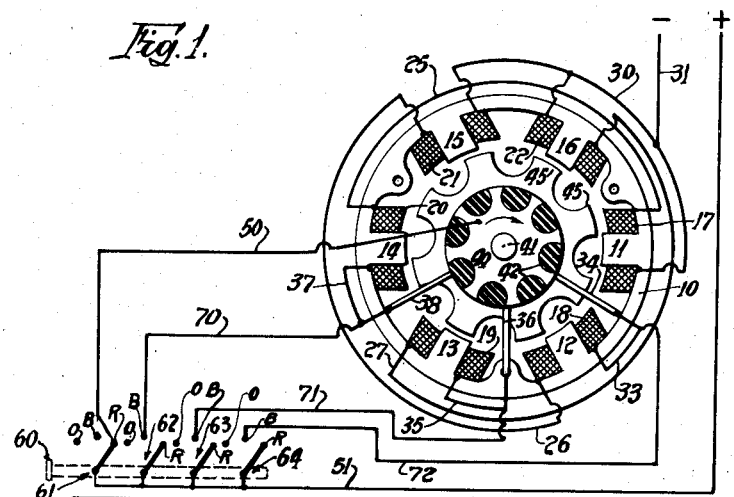
Figure 1 shows an impulse type motor with a switching system for utilizing all of the poles of the motor for stopping the rotation thereof.

The motor shown in Figure 1 comprises a stator 10 having a plurality of inwardly extending pole pieces 11 to 16 inclusive, here shown as six in number. Around each pole piece is a suitable winding 17 to 22, inclusive. Diametrically opposed pole pieces work together and the magnetizing coils therefor are suitably interconnected. Thus, coil 17 is connected by a conductor 25 to coil 20. Coil 18 is similarly connected by a conductor 26 to coil 21, while coil 19 is connected by conductor 27 to coil 22. One terminal of each of coils 17, 21 and 22 are connected together by a conductor 30 which in turn is connected by a lead 31 to one terminal of a supply circuit. The free terminal of coil 18 is connected by a conductor 33 to a brush 34. Similarly, coil 19 is connected by a conductor 35 to a brush 36 and coil 20 is connected by a conductor 37 to a brush 38. These brushes are adapted to bear on a conducting disc 40 mounted upon a shaft 41. Disc 40 has a plurality of insulating segments 42 uniformly distributed around the edge thereof, said insulating segments being eight in number. Coupled to shaft 41 is a stator of suitably laminated steel and having eight teeth 45 uniformly spaced around the periphery thereof. The angular extent of the teeth and pole faces is preferably determined by the formula disclosed in the Ruben patent herein before referred to, although, of course, other relative dimensions may be used. Conducting disc 40 is connected by a lead 50 and through a switch section to be later described to a lead 51 to the other terminal of the power source.

In order to control the motor, a switch 60 having a plurality of sections 61, 62, 63 and 64 is provided. Each switch section has three contact positions indicated by the letters R, B and O as running, braking and off. As shown in the drawing, switch section 61 has R contact connected to lead 50. The rotor portions of all the switch sections are connected through shaft 60 to lead 51. The B contact of switch section 62 is connected by lead 70 to conductor 37. The B contact of switch section 63 is connected by lead 71 to conductor 35, while the B contact of switch section 64 is connected by lead 72 to conductor 33.

In the position of the switch shown in the figure, the motor is adapted to run by virtue of the connection of the positive side of the power supply through lead 51, switch section 61, lead 50, to conducting disc 40. Through the various brushes, circuits are completed through to the negative pole of the power supply, and by virtue of progressive energizations of opposing pole pairs, it is clear that the rotor will have movement induced therein. If quick stop is desired, shaft 60 of the switch is turned so that the rotors are in the B position. In such a position the three brushes 34, 36 and 38 are shorted out and all the field coils are simultaneously and continuously energized. An extremely powerful field resulting therefrom, exerts a braking action on the rotor and tends to stop it in the first position where the magnetic paths are at a minimum.

Figure 2:
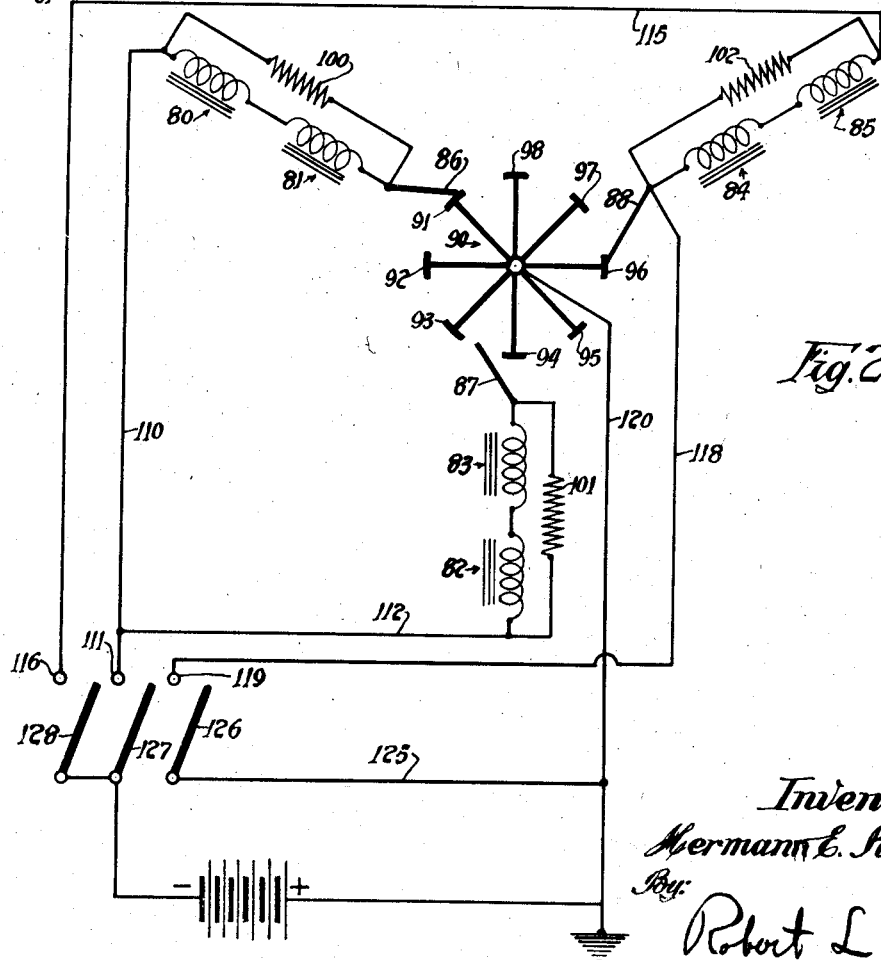
Figure 2 shows a modified form wherein only one pair of poles are used.

In case a simpler and not so powerful stopping motion is desired only one set of coils may be energized as shown in Figure 2. In this figure the opposing coil pairs are shown together for simplicity and indicated by numerals 80 to 85 inclusive. Each pair of opposed field coils are connected in series as shown and have one terminal connected respectively to brushes 86 and 88 inclusive, cooperating with the commutator 90 having conducting segments 91 to 98, inclusive, separated by insulating segments as above. Across each pair of opposed field coils may be connected a stabilizing resistance 100 to 102 respectively and adapted to reduce sparking at the commutator. The outer terminal of coils 80 and 81 is connected by a lead 110 to a switch point 111. The outer terminal of coil pairs 82 and 83 are connected by lead 112 to switch point 111. The outer terminal of coil pairs 84 and 85 is connected by a lead 115 to a switch point 116. The inner terminal of coil pairs 84 and 85 is connected by a lead 118 to a switch point 119. Commutator 90 is connected by a lead 120 down to ground to which the positive pole of the supply source happens to be connected. Lead 120 is connected by a lead 125 to switch arm 126 adapted to cooperate with switch point 119. Switch arms 127 and 128 are connected together to the negative terminal of the supply source and are adapted to cooperate respectively with switch points 111 and 116. In order to operate the motor, switch arms 127 and 128 are closed against contacts 111 and 116. In this condition, it is clear that through leads 110, 112 and 115, the outer terminals of all of the field coils will be energized while the return lead 120 from the commutator completes the circuit for normal running operation. In the event that a braking action is desired, switch blades 126 and 128 only are closed. This energizes field coils 84 and 85 only independently of the commutator, since the return circuit is through lead 118 and switch blade 126. After the motor has stopped, all the switch poles may be open as shown in the figure, so that no current is consumed.

What is claimed is:

1. An electric impulse motor system comprising a rotor having a plurality of teeth of magnetically permeable material spaced around its periphery, a stator having a plurality of poles distributed around said rotor, each of said poles having a magnetizing coil and a core of magnetically permeable material within said coil, contactor means connected to a supply circuit for periodically energizing each of said coils and switching means for disconnecting said supply circuit from said contactor means and short circuiting at least one coil for obtaining an index stopping action.

2. The system of claim 1 wherein said coils are connected in opposed pairs and are controlled by said contactor means and switching means in such opposed pairs.

3. The system of claim 1 wherein said switching means short-circuits all the coils.

4. The system of claim 1 wherein said coils are connected in opposed pairs and are controlled by said contactor means in such opposed pairs and wherein said switching means short-circuits all the coils.

HERMANN E. KRANZ.